Figure 1:
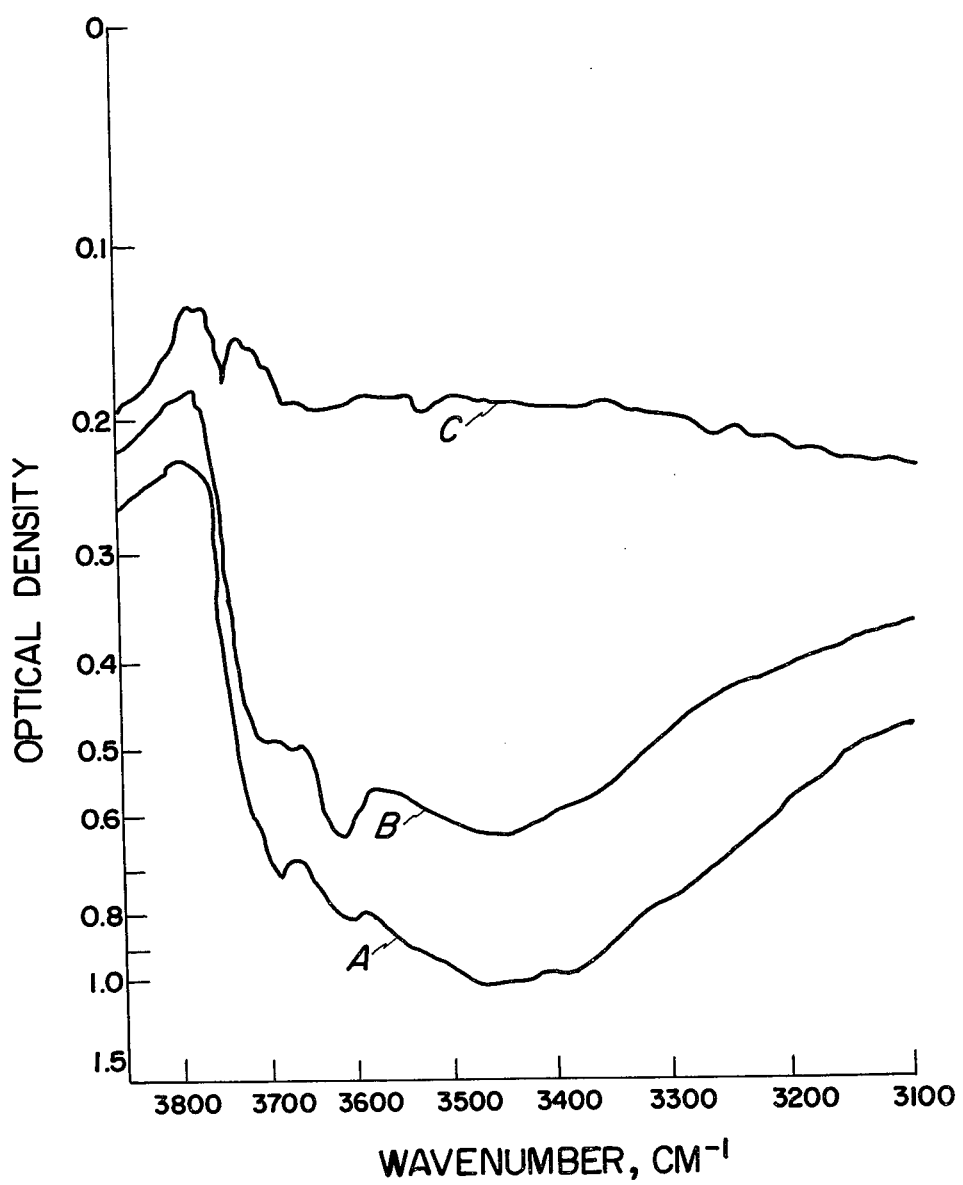

United States Patent [19]

Grose et al.

[11] 4,257,885

[45] Mar. 24, 1981

[54] NOVEL ZEOLITE COMPOSITIONS AND PROCESSES FOR PREPARING AND USING SAME

[75] Inventors: Robert W. Grose, Mobile, Ala.; Edith M. Flanigen, White Plains, N.Y.

[73] Assignee: Union Carbide Corporation, New York, N.Y.

[21] Appl. No.: 63,961

[22] Filed: Aug. 6, 1979

Related U.S. Application Data

[63] Continuation-in-part of Ser. No. 655,065, Feb. 4, 1976, abandoned.

[51] Int. Cl.³ .............................................. B01D 15/00
[52] U.S. Cl. ........................................ 210/691; 55/75; 252/455 Z; 423/328
[58] Field of Search ........................ 55/75; 210/24, 40; 252/455 Z; 260/448 C; 423/328, 329

[56] References Cited

U.S. PATENT DOCUMENTS

| | | | |
|---|---|---|---|
| 3,321,272 | 5/1967 | Kerr | 423/329 |
| 3,334,964 | 8/1967 | Reid | 252/455 Z |
| 3,436,174 | 4/1969 | Sand | 423/328 |
| 3,702,886 | 11/1972 | Argauer et al. | 423/328 |
| 3,732,326 | 5/1973 | Chen | 55/75 |
| 4,175,114 | 11/1979 | Plank et al. | 423/329 |

Primary Examiner—Ivars C. Cintins
Attorney, Agent, or Firm—Richard G. Miller

[57] ABSTRACT

Highly siliceous crystalline zeolitic molecular sieve compositions, having pore diameters of approximately 6 Angstroms, are prepared hydrothermally from reaction mixtures free of organic cations. These novel zeolites can be distinguished from all other zeolites on the basis of certain infrared spectral characteristics and have hydrophobic/organophilic properties which permit their use in selectively adsorbing organic materials from water, either in liquid or in vapor phase.

16 Claims, 3 Drawing Figures

NOVEL ZEOLITE COMPOSITIONS AND PROCESSES FOR PREPARING AND USING SAME

Related Applications

This application is a continuation-in-part of copending application Ser. No. 655,065, filed Feb. 4, 1976, now abandoned.

The present invention relates in general to the hydrothermal synthesis of zeolites, and more particularly to a novel class of zeolitic molecular sieve compositions having relatively high $SiO_2/Al_2O_3$ molar ratios, and to the method for their preparation.

The cyrstalline zeolites, both naturally-occurring and synthetically prepared, are hydrated aluminosilicates whose structures are based on a theoretically limitless three-dimensional network of $AlO_x$ and $SiO_y$ tetrahedra linked by the sharing of oxygen atoms. Zeolites are commonly represented by the empirical formula $$M_{2/n}O \cdot Al_2O_3 \cdot x\, SiO_2 \cdot y\, H_2O,$$

wherein x is equal to or greater than 2, and n is the valence of the cation M. In the naturally-occurring, i.e., mineral zeolites, the cation is a metal of group I or group II, especially sodium, potassium, calcium, magnesium and strontium. In synthetic species the cation in the as-synthesized form can be, in addition, ammonium and any of a variety of organic nitrogenous cations such as alkylammonium and arylammonium, although the use of some organic nitrogenous compounds such as tetramethylammonium salts have the drawbacks of potential toxicity and relatively high reactant costs. As a general proposition the zeolite cations are at least partly exchangeable, although cation size and steric considerations of the crystal lattice sometimes preclude ion-exchange with or for certain cations, including the above-mentioned organic nitrogenous cations.

For reasons not fully understood, the zeolite species which crystallize from aluminosilicate gels are strongly dependent upon the cation species present therein. For example, gel compositions which product zeolite A and zeolite X when sodium is the sole alkali metal present, produce zeolite F and zeolite P respectively when potassium is substituted for the sodium in the gel compositions. In other instances, changing the cation species in gel compositions will produce a zeolite of the same crystal configuration but also create changes in the expected $SiO_2/Al_2O_3$ molar ratio of the zeolite product.

The zeolites prepared in accordance with the practice of the present invention have a chemical composition expressed in terms of moles of oxides as follows:

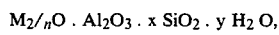

0.8–3.0 $M_{2/n}O$:$Akl_2O_3$:10–100 $SiO_2$:0–40 $H_2O$, wherein M represents a metallic cation and n represents the valence of M as prepared from reaction mixtures free of organic cations. These zeolites may be exchanged with ammonium or other cations, including metal ions, hydrogen ions, rare earth ions and mixtures thereof by contacting the zeolite with solutions containing the desired cation(s).

In conjunction with the aforesaid chemical composition, the zeolites of this invention possess a distinguishing crystalline structure characterized by an X-ray powder diffraction pattern having at least the following interplanar spacings:

TABLE I

| Interplanar Spacing, d (A) |
|---|
| 11.1 ± 0.2 |
| 10.1 ± 0.2 |
| 3.85 ± 0.07 |
| 3.74 ± 0.05 |
| 3.72 ± 0.05 |

These values were determined by standard techniques. The radiation was the K-alpha doublet of copper, and a scintillation-counter spectrometer with a strip-chart pen recorder was used. The peak heights and the peak or line positions as a function of two times theta ($\theta$), where theta is the Bragg angle, were read from the spectrometer chart. From these, the relative intensities and d (obs.), the interplanar spacing in A, corresponding to the recorded lines, were determined. In Tables II, III and IV the relative intensities are given in terms of numerical values.

Ion-exchange of the original cations by other cation species does not substantially alter the X-ray pattern of the zeolite, but some minor shifts in interplanar spacing and variation in relative intensity can occur. Other minor variations can occur depending on the silicon-to-aluminum ration of the particular sample and whether or not the sample had been sujected to elevated temperatures. In any event the d-spacings of the X-ray pattern will be within the tolerances indicated in Table I.

In conjunction with the aforesaid chemical composition and X-ray powder diffraction pattern, the zeolites prepared according to this invention exhibit certain distinguishing infrared absorption characteristics. Infrared analytical techniques are recognized as highly useful in the study of crystalline zeolites; see for example U.S. Pat. Nos. 3,506,400 and 3,591,488 to Eberly, Jr. et al., issued Apr. 14, 1970 and July 6, 1971, respectively, and E. M. Flanigen, H. Khatami and H. A. Szymanski, "Adv. Chem. Series", Vol. 101, 1971 (pg. 201 et seq.)

Infrared analysis was employed to characterize the siliceous zeolites prepared according to the process of the present invention involving an organic-free reaction system with the result that such zeolites are in fact clearly distinguishable from the structurally-related materials designated as the "family"of "ZSM-5" materials such as "ZSM-5", disclosed in U.S. Pat. No. 3,702,886 to Argauer et. al., Nov. 14, 1972, and "ZSM-8", disclosed in British Specification No. 1,334,243 published Oct. 17, 1973.

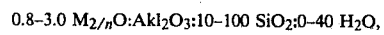

Spectra were obtained on a Perkin-Elmer Model 112 single-beam instrument for the hydroxyl-stretching region 3800–3000 cm$^{-1}$, on a Perkin-Elmer Model 621 double-beam instrument for both the mid-infrared region 1600–1300 cm$^{-1}$ and the framework region 1300–300 cm$^{-1}$. After calcination for two hours at 600° C. to remove any organic ammonium materials and equilibration with ambient air, the samples were pressed into self-supported wafers (20 mg.), and the spectra in the hydroxyl-stretching region were obtained after thermal treatments at 200° C. in vacuum for one hour.

Referring now to spectra presented in FIG. 1 of the drawings, namely spectra "A" for ZSM-5 and "B" for ZSM-8, it is evident that in the spectral region assigned to hydroxyl-stretching, approximately 3800–3000 cm$^{-1}$, there exist in the case of ZSM-5 and ZSM-8 materials broad characteristic absorption bands, i.e. regions of increased optical density values, specifically those centered at about 3450 cm$^{-1}$, corresponding to the characteristic frequencies of the O-H bond. In the case of the zeolite material of the present invention, spectrum "C", however, it is also evident from examination thereof that in the region 3600-3100 cm$^{-1}$ the aforementioned broad absorption bands are now substantially absent in such spectrum.

Figure 2:
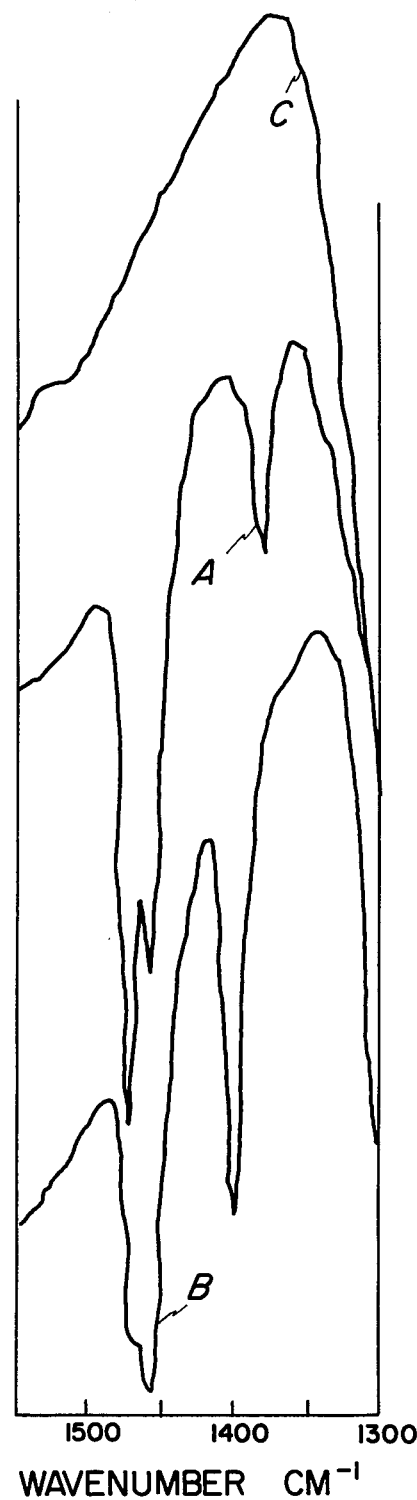

The mid-infrared region infrared spectra of the three materials ZSM-5, ZSM-8 and the material of the present invention were all run as self-supported wafers in their as-synthesized form prior to calcination. Referring now to FIG. 2 which shows the C-H deformation region portion (1300-1500 cm$^{-1}$) of these spectra as "A", "B" and "C" respectively, it is evident from "A" and "B" that the ZSM-5 and ZSM-8 materials exhibit sharp absorption bands, specifically in two groups between 1350-1400 cm$^{-1}$ and between 1450-1500 cm$^{-1}$ corresponding to characteristic C—H vibrations of organic groups such as CH$_3$ and CH$_2$ contained therein. In the case of the material of the present invention, however, it is evident from spectrum "C" of FIG. 2 that the aforementioned sharp C—H absorption bands are totally missing in such spectrum.

Raman spectroscopy is, like infrared, another useful tool for study and characterization of molecules which records their spectra in the same vibrational energy region. A discussion of the technique, its use and its ability to complement infrared techniques is found in *Physical Methods in Inorganic Chemistry*, R. S. Drago, Reinhold Pub. Co., New York, New York (1965).

Figure 3:
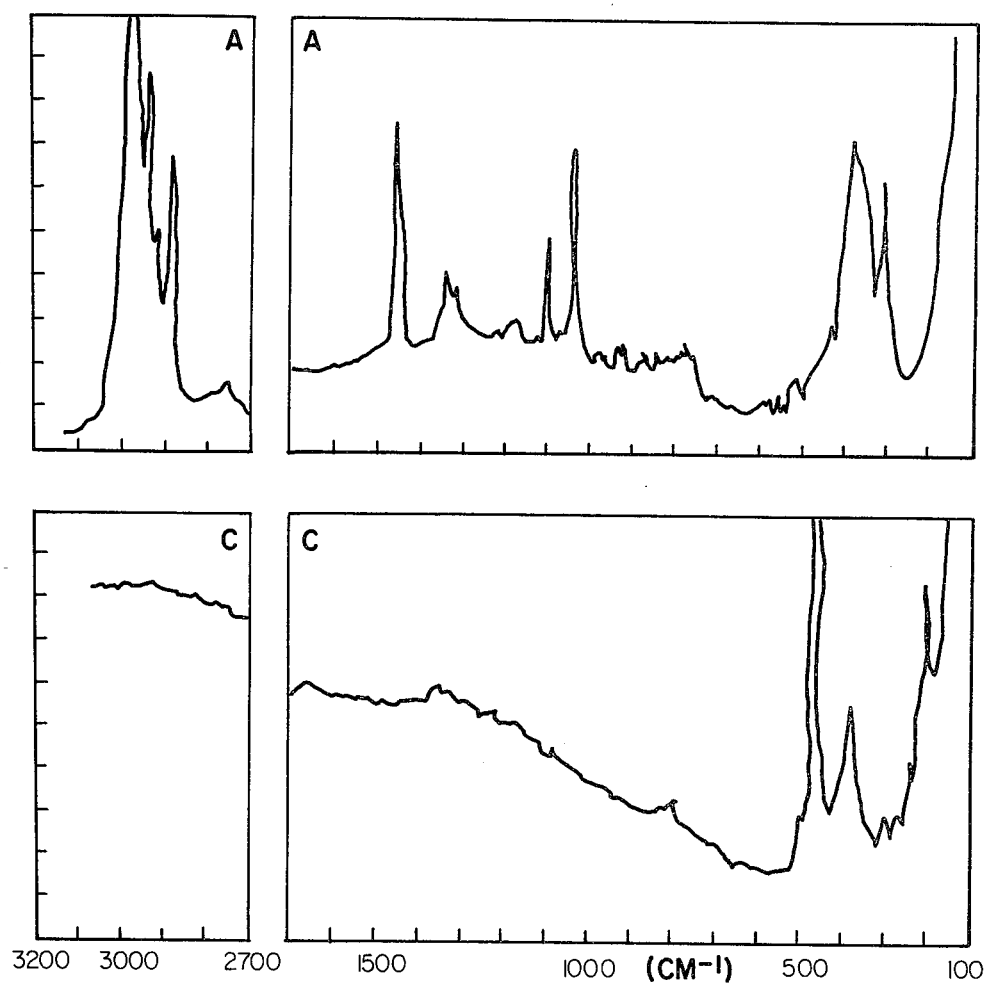

In FIG. 3, portions of the Raman spectra of ZSM-5 and of the zeolite of the present invention, both run as pressed pellets of the as-synthesized materials prior to calcination, are shown respectively as curves "A" and "C". Many sharp, strong absorption bands are evident in curve "A"; those in the region 2400-3200 cm$^{-1}$ being characteristic of C—H stretch vibrations. Those between 100-1700 cm$^{-1}$ are less easily assigned byt are characteristic of the ZSM-5 material shown. The absence in curve "C" of all these sharp bands, save one near 380 cm$^{-1}$, strikingly illustrates the different character of the zeolite of the present invention.

Accordingly it is concluded, among other things, that as a result of the preparative method employed, according to the method of the present invention the siliceous zeolite products when calcined at 600° C. in air are characterized by an infrared spectrum showing substantially no absorption within the regions 3600-3100 cm$^{-1}$.

The zeolite compositions of the present invention are readily composed by preparing an organic-free reaction mixture having a composition, in terms of mole ratios of oxides, falling within one of the following ranges:

| | I | II | III | IV |
|---|---|---|---|---|
| SiO$_2$/Al$_2$O$_3$ | 10-100 | 20-80 | 40-60 | 40-60 |
| Na$_2$O/SiO$_2$ | 0.02-0.3 | 0.02-0.2 | 0.1 | 0.1 |
| H$_2$O/(Na$_2$O + M$_{\frac{2}{n}}$O) | 20-600 | 30-500 | 50-400 | 50-200 |
| (Na$_2$O + M$_{\frac{2}{n}}$O)/SiO$_2$ | 0.02-0.5 | 0.02-0.25 | 0.1 | 0.1 | wherein M represents a metal cation selected from Groups I and II of the Periodic System of Elements, particularly lithium, barium, calcium and strontium, and n is the valence of cation M. Range I above represents a broad range ofreactant compositions; Range II is a preferred operating range for reasons of product purity and process economics; Ranges III and IV are especially preferred for syntheses when sodium is the only desired metallic cation therein. The lower proportions of water permitted by the gel compositions of Range IV are advantageous in large scale commercial synthesis processes.

In forming the reaction mixture, the reagent sources of the oxides of the aforesaid empirical compositions are those conventionally used in zeolite synthesis. Representative of such reagents are activated alumina, gamma alumina, alumina trihydrate, sodium aluminate, sodium silicate, silica gels, silicic acid, aqueous colloidal silica sols ans solid reactive amorphous silicas. The metal oxides represented by M$_2$O are preferably added to the reaction mixture in the form of salts readily soluble in water or in the form of hydroxides. Na$_2$O is the source of sodium cations and alkalinity, advantageously added as sodium hydroxide, sodium aluminate or sodium silicate. No alkylammonium or arylammonium compounds are incorporated in this reaction mixture.

Thereafter, the reaction mixture is maintained for a period of from 6 to 200 hours at a temperature of from 80° C. to 210° C. at autogenous pressure. The resulting crystalline zeolite is then isolated by filtration, washed with water and dried.

In general the use of nucleating agents or "seeds" in the crystallization procedure is beneficial in producing a product of higher purity and in greater yields. The seeds can be, but are not limited to previously synthesized crystallites of the zeolite of the present invention. Seed crystals of other structurally related zeolite species can also be used, for exapmle, ZSM-5, ZSM-8. Also non-zeolitic species with somewhat similar crystal morphology have been found to be effective seeding agents. This includes silicalite, a crystalline silica polymorph disclosed in U.S. Pat. No. 4,061,724 issued Dec. 6, 1977 and the various species of crystalline organosilicates described in U.S. Pat. No. 3,941,871 issued Mar. 2, 1976 and reissued as Re. 29,948, Mar. 27, 1979. These seed compositions can be used in their as-synthesized state or in their post-calcination state in which any organic constituents, both structural and non-structural, have been thermally removed. Calcined silicalite seeds have been found to be especially effective and are preferred. In general the cation species present in the zeolite seed crystals is not a critical factor.

Dehydration of the zeolite of the present invention can be carried out conveniently by purging with dry air of nitrogen, or by evacuating, at temperatures from ambient and above, to produce a useful absorbent and catalyst support. The zeolite has an effective pore diameter of about 6A as determined by adsorption characterization.

This pore size permits the separation of mixtures of certain organic compounds, for example, non-quaternary carbon-containing paraffins or olefins are selectively adsorbed from mixtures containing molecules which have a quaternary carbon atoms. The zeolite is also useful in the separation of p-xylene from mixtures with o-xylene, m-xylene and ethylbenzene.

One separation process contemplated here comprises in general terms the steps of contacting an aqueous solution or mixture such as a wastewater influent containing an organic compound with the siliceous zeolite of the invention; adsorbing at least a portion of the organic compound in the inner adsorption surfaces of this zeolite and thereafter recovering, optionally as an effluent stream, the treated aqueous solution or mixture exhibiting a depleted organic compound content.

The following examples serve to illustrate the method of preparation and the absorptive properties of the present invention.

EXAMPLE I

A reaction mixture was prepared by dissolving 1.2 g of NaOh and 0.6 g NaAlO$_2$ (30.2 wt.-% Na$_2$O, 44.1 wt.-% Al$_2$O$_3$, 24.3 wt.%-H$_2$O) in 25 g of hot H$_2$O and adding with stirring to 44 g of aqueous colloidal silica sol (30 wt.-% SiO$_2$) in 100 g of H$_2$O. The overall molar oxide composition was:

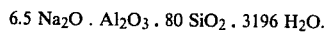

6.5 Na$_2$O . Al$_2$O$_3$ . 80 SiO$_2$ . 3196 H$_2$O.

The reactant mixture was placed in a polytetrafluoroethylenelined autoclave and maintained at about 200° C. and autogenous pressure for about 72 hours. The solid product was separated by filtration, washed with H$_2$O and dried at 110° C. Chemical analysis of a sample of this product gave the following compositions: 1.9 wt.-% Na$_2$O, 2.7 wt.-% Al$_2$O$_3$, 89.2 wt.-% SiO$_2$, 5.5 wt.-% H$_2$O. The molar compositions was, in terms of oxides,

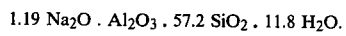

1.19 Na$_2$O . Al$_2$O$_3$ . 57.2 SiO$_2$ . 11.8 H$_2$O.

A portion of the product was activated at 350° C. in vacuum for about 16 hours in a McBain-Bakr gravimetric adsorption system. The activated zeolite adsorbed 8.2 wt.-% O$_2$ at 750 torr, −183° C.; 3.9 wt-% isobutane at 750 torr, 23° C.; 0.3 wt.-% neopentane at 750 torr, 23° C.; and 7.7 wt.-% H$_2$O at 20 torr, 23° C. The X-ray powder diffraction pattern of the zeolite product is set forth in Table II, below:

TABLE II

| d-Å | I |
|---|---|
| 11.2 | 15 |
| 10.16 | 24 |
| 9.82 | 4 |
| 9.02 | 4 |
| 7.44 | 1 |
| 7.02 | 1 |
| 6.66 | 1 |
| 6.37 | 2 |
| 5.98 | 4 |
| 5.72 | 3 |
| 5.57 | 2 |
| 5.37 | 1 |
| 5.10 | 1 |
| 5.01 | 3 |
| 4.60 | 1 |
| 4.51 | 1 |
| 4.37 | 4 |
| 4.08 | 1 |
| 4.00 | 4 |
| 3.85 | 41 |
| 3.82 | 27 |
| 3.74 | 15 |
| 3.72 | 10 |
| 3.65 | 5 |
| 3.60 | 1 |
| 3.45 | 6 |
| 3.25 | 2 |
| 3.19 | 2 |
| 3.15 | 1 |
| 3.06 | 3 |
| 3.00 | 4 |
| 2.95 | 1 |

EXAMPLE 2

A reaction mixture was prepared by adding 6.4 g of aqueous positive sol (26 wt.-% SiO$_2$, 4 wt.-% Al$_2$O$_3$) to 35 g of aqueous colloidal silica sol (30 wt.-% SiO$_2$) in 64 g of H$_2$O with stirring. To the resultant precipitate was added 1.3 g of NaOH dissolved in 25 g of H$_2$O and 0.6 grams LiOH . H$_2$O dissolved in 25 grams H$_2$O. The overall molar oxide composition was:

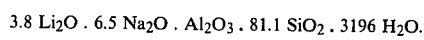

3.8 Li$_2$O . 6.5 Na$_2$O . Al$_2$O$_3$ . 81.1 SiO$_2$ . 3196 H$_2$O.

The reactant mixture was placed in a polytetrafluoroethylenelined autocalve and maintained at about 200° C. and autogenous pressure for about 70 hours. The solid product was separated by filtration, washed with H$_2$O, and dried at 110° C. Chemical analysis of the zeolite product gave the following composition: 1.2 wt.-% Li$_2$O, 1.1 wt.-% Na$_2$O, 2.0 wt.-% Al$_2$O$_3$, 91.7 wt.-% SiO$_2$, 3.3 wt.-% H$_2$O. The molar oxide composition was:

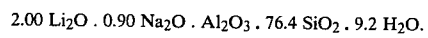

2.00 Li$_2$O . 0.90 Na$_2$O . Al$_2$O$_3$ . 76.4 SiO$_2$ . 9.2 H$_2$O.

A portion of the product was activated at 350° C. in vacuum for about 16 hours in a McBain-Bakr gravimetric adsorption system. The activated sample adsorbed 7.2 wt.-%O$_2$ at 750 torr, −183° C.; 4.1 wt.-% n-butane at 750 torr, 23° C.; 9.7 wt.-% SF$_6$ at 750 torr, 23° C.; 0.3 wt.-% neopentane at 750 torr, 23° C.; and 7.3 wt.-% H$_2$O) at 20 torr, 23° C.

Another part of the zeolite product was ion-exchanged by slurrying three times in 10% NaCl solution at about 80° C. The sodium-exchanged sample was filtered, washed with H$_2$O and dried at 110° C. Chemical analysis gave the following composition: 0.5 wt.-% Li$_2$O, 1.4 wt.-% Na$_2$O, 2.1 wt.-% Al$_2$O$_3$, 89.1 wt.-% SiO$_2$, 6.9 wt.-% H$_2$O. The molar oxide composition was:

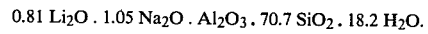

0.81 Li$_2$O . 1.05 Na$_2$O . Al$_2$O$_3$ . 70.7 SiO$_2$ . 18.2 H$_2$O.

The Na+- exchanged sample was then activated at 350° C. in vacuum for about 16 hours. The activated material adsorbed 7.5 wt.-% O$_2$ at 750 torr, −183° C.; 4.0 wt.-% n-butane at 750 torr, 23° C.; 10.4 wt.-% SF$_6$ at 750 torr, 23° C.; and 8.8 wt.-% H$_2$O at 18 torr, 23° C.

The X-ray powder diffraction pattern of the zeolite product is set forth in Table III below.

TABLE III

| d-Å | I |
|---|---|
| 11.2 | 13 |
| 10.00 | 85 |
| 9.02 | 1 |
| 7.44 | 1 |
| 7.08 | 1 |
| 6.76 | 1 |
| 6.37 | 1 |
| 5.98 | 4 |
| 5.68 | 3 |
| 5.57 | 2 |
| 5.37 | 1 |
| 5.01 | 9 |
| 4.96 | 10 |
| 4.62 | 1 |
| 4.08 | 3 |
| 4.00 | 4 |
| 3.85 | 38 |
| 3.83 | 23 |
| 3.75 | 12 |
| 3.72 | 10 |
| 3.65 | 8 |
| 3.60 | 9 |
| 3.49 | 3 |
| 3.44 | 4 |
| 3.25 | 2 |
| 3.19 | 1 |

TABLE III-continued

| d-Å | I |
| --- | --- |
| 3.05 | 3 |
| 2.99 | 4 |

EXAMPLE 3

A reaction mixture was prepared by adding 6.4 grams aqueous positive sol (26 wt.-% $SiO_2$, 4. wt.-% $Al_2O_3$) to 20 g of aqueous colloidal silica sol (30 wt.-% $SiO_2$) in 74 g of $H_2O$ stirring. 1.3 g of NaOH dissolved in 25 g of $H_2O$ and 3.0 g of $Ba(OH)_2 : 8 H_2O$ dissolved in 25 g of $H_2O$ were then added consecutively with stirring to the silica-alumina precipitate. The molar oxide composition of the resultant mixture was:

3.8 BaO . 6.5 $Na_2O$ . $Al_2O_3$ . 51.1 $SiO_2$ . 3196 $H_2O$

The reactant mixture was placed in a polytetrafluoroethylene-lined auotclave and maintained at about 200° C. and autogenous pressure for about 68 hours. The solid product was separated by filtration, washed with $H_2O$ and dried at 110° C. Chemical analysis of the zeolite product gave the following composition: 7.4 wt.-% BaO, 2.2 wt.-% $Na_2O$, 3.8 wt.-% $Al_2O_3$, 77.2 wt.-% $SiO_2$, 6.5 wt.-% $H_2O$. The molar oxide composition was:

1.30 BaO . 0.95 $Na_2O$ . $Al_2O_3$ . 34.8 $SiO_2$ . 9.8 $H_2O$.

A portion of the product was activated at 350° C. in vacuum for about 16 hours in a McBain-Bakr gravimetric adsorption system. The activated zeolite absorbed 12.9 wt.-% $O_2$ at 750 torr, −183° C.; 7.0 wt.-% n-butane at 750 torr, 23° C.; 19.0 wt.-% $SF_6$ at 750 torr, 23° C., and 10.7 wt.-% $H_2O$ at 18 torr, 23° C. The X-ray powder diffraction pattern is set forth in Table IV below.

TABLE IV

| d-Å | I |
| --- | --- |
| 11.2 | 21 |
| 10.05 | 40 |
| 9.02 | 2 |
| 7.44 | 1 |
| 7.08 | 1 |
| 6.76 | 2 |
| 6.37 | 2 |
| 5.98 | 6 |
| 5.72 | 4 |
| 5.57 | 3 |
| 5.37 | 1 |
| 5.01 | 5 |
| 4.98 | 4 |
| 4.67 | 1 |
| 4.60 | 1 |
| 4.33 | 2 |
| 4.08 | 8 |
| 3.85 | 46 |
| 3.82 | 26 |
| 3.74 | 16 |
| 3.72 | 12 |
| 3.65 | 6 |
| 3.59 | 2 |
| 3.53 | 4 |
| 3.44 | 4 |
| 3.25 | 3 |
| 3.13 | 5 |
| 3.08 | 5 |
| 3.05 | 5 |
| 3.00 | 5 |

EXAMPLE 4

A reaction mixture was prepared by dissolving 0.6 g of NaOH and 0.6 of $NaAlO_2$ (30.2 wt.-% $Na_2O$, 44.1 wt.-% $Al_2O_3$, 24.3 wt.-% $H_2O$) in 25 g of hot $H_2O$ and adding with stirring to 16.5 g of aqueous colloidal silica sol (30 wt.-% $SiO_2$) in 55 g of $H_2O$. The overall molar oxide composition was:

3.8 $Na_2O$ . $Al_2O_3$ . 30 $SiO_2$ . 1855 $H_2O$.

The reactant mixture was placed in a polytetrafluoroethylene-lined autoclave and maintained at about 200° C. and autogenous pressure for about 120 hours. The solid product was separated by filtration, washed with $H_2O$, and dried at 110° C. The X-ray powder diffraction pattern of the zeolite product contained all of the lines of Table I.

EXAMPLE 5

A reaction mixture was prepared by dissolving 0.95 g of NaOH and 0.6 g of $NaAlO_2$ (30.2 wt.-% $Na_2O$, 44.1 wt.-% $Al_2O_3$, 24.3 wt.-% $H_2O$) in 25 g of hot $H_2O$ and adding with stirring to 33 g of silica sol (30 wt.-% $SiO_2$) in 33 g of $H_2O$. The overall molar oxide composition was:

5.4 $Na_2O$ . $Al_2O_3$. 60 $SiO_2$. 1645 $H_2O$.

The reactant mixture was placed in a polytetrafluoroethylene-lined autoclave and maintained at about 200° C. and autogenous pressure for about 70 hours. The solid product was separated by filtration, washed with water and dried at 110° C. The X-ray powder diffraction pattern of the zeolite product contained the lines of Table I.

EXAMPLE 6

A reaction mixture was prepared by dissolving 1.2 g. of NaOH and 0.6 g. of $NaAlO_2$ (30.2 wt.-% $Na_2O$, 44.1 wt.-% $Al_2O_3$, 24.3 wt.-% $H_2O$) in 25 g. of hot water and adding with stirring to 44 g. of silica sol (30 wt.-% $SiO_2$) in 100 g. of water. The overall molar oxide composition was:

6.5 $Na_2O$ : $Al_2O_3$ : 80 $SiO_2$ : 3196 $H_2O$

The reactant mixture was placed in a polytetrafluoroethylene-lined autoclave and maintained at about 150° C. for about 122 hours. The solid product was separated by filtration, washed with water and dried at 110° C. The X-ray powder diffraction pattern of the zeolite product contained the lines of Table I.

EXAMPLE 7

A reaction mixture was prepared by initiallydissolving 540 grams of sodium aluminate in an aqueous solution composed of 900 grams of reagent-grade sodium hydroxide dissolved in 6 kilograms of water at 95° C. A slurry of 24.7 kilograms of an aqueous colloidal silica sol was admixed with 54.5 kilograms of water and a second slurry of 900 grams of as-synthesized zeolite ZSM-5 in about 900 grams of water was also prepared. Thereafter the hot sodium aluminate solution was admixed with the aqueous silica sol followed by incorporation of the zeolite-water slurry. The resultant mixture was thoroughly blended by stirring for 5 minutes. The overall molar oxide composition of the reaction mixture (excluding the contribution of the zeolite-water slurry) was 5.6 Na$_2$O : Al$_2$O$_3$ : 50 SiO$_2$ : 1768 H$_2$O.

This mixture was maintained at temperature of 150° C. for 120 hours. The solid product was separated from the liquor by filtration, washed with 100 gallons of water and dried. Chemical analysis of a sample of this product indicated the following composition: 3.1 wt.-% Na$_2$O, 3.3 wt.-% Al$_2$O$_3$, 82.0 wt.-% SiO$_2$, 0.8 wt.-% C., 0.06 wt.-% N, Loi 9.2 wt.-%. A sample of this product was also submitted for X-ray powder diffraction analysis. The product was accordingly identified as the zeolite of the present invention.

EXAMPLE 8

A 110 lb. batch of the zeolite of the present invention was prepared by the following procedure: (a) 8.64 lbs. of Al$_2$O$_3$ . 3H$_2$O was dissolved in hot (110° C.) caustic solution containing 22.5 lbs. of NaOH in 23 lbs. of water; (b) 165.2 lbs. of amorphous solid reactive silica was slurried in 744 lbs. of water; (c) 18.8 lbs. (anhydrous weight) of silicalite crystals, which have been calcined at 600° C. to remove the tetrapropylammonium compound present in the as-synthesized form, was added to the silica slurry of step (b); (d) the aluminate slurry of step (a) was added to the mixture of step (c) and mixed thoroughly. The resultant gel was heated to 125° C. and maintained under autogeneous pressure and quiescently for 72 hours. Thereafter the zeolite crystals formed were isolated by filtration and washed with water to reduced the pH to below 10. The washed product was dried at 100° C.

As illustration of the remarkable selectivity of the zeolite composition prepared according to the present invention for organic materials over water, data are presented in Table V. The procedure employed is as follows: A 1.0 gram sample of the zeolite and 10.0 grams of the aqueous organic solution are placed in a serum bottle which is capped, shaken and allowed to equilibrate for at least 12 hours. A blank (same aqueous organic solution without adsorbent) is always used for comparison. Analysis of the treated solution is done by gas chromatography. The molar SiO$_2$/Al$_2$O$_3$ ratio of the zeolite was 44.

TABLE V

| Organic Component | Original Conc. of Organic Cmpd | Percent Organic Component Removed |
|---|---|---|
| 1-butanol | 1.0 vol.-% | 98 |
| Methylcellosolve | 1.0 vol.-% | 67 |
| methanol | 1.0 vol.-% | 17–22 |
| phenol | 0.1 vol.-% | 70–75 |

Using the same zeolite composition and the same experimental procedure as that employed to obtain the data of Table V, it was found that 41 percent of an original concentration of sulfur dioxide in water of 0.7 volume-% was selectively adsorbed by the zeolite.

The foregoing information on the separation capabilities of the zeolite composition of this invention demonstrates that a variety of useful industrial processes employing this hydrophobicorganophilic adsorbent are now made possible. As examples of organic components often found in various industrial or municipal waste streams, methanol, butanol, methylcellosolve, phenol and sulfur dioxide are effectively separated from aqueous solutions or admixtures containing such components.

EXAMPLE 9

A reaction mixture was prepared by addition of 6.4 g of an aqueous sol of silica and alumina (26wt.-% SiO$_2$, 4 wt.-% Al$_2$O$_3$) to 35g of an aqueous colloidal silica sol (30wt.-% SiO$_2$) dispersed in water. 1.3g of NaOH dissolved in water was then added with stirring. The total quantity of water added to the above was 114g. The molar oxide composition of the resultant mixture was:

6.5 Na$_2$O . Al$_2$O$_3$ . 81.1 SiO$_2$ . 3199 H$_2$O 1g of ZSM-5 seed crystals prepared according to the teachings of U.S. Pat. No. 3,702,886 was then blended into this mixture, which was then placed in a polytetrafluoroethylene-lined autocalve and maintained at about 200° C. and autogenous pressure for about 68 hours. The solid product was filtered, washed with H$_2$O, and dried at 110°.

The x-ray powder diffraction pattern of the solid product contained all the lines of Table I, in addition to lines corresponding to presence of quartz impurity.

EXAMPLE 10

A reaction mixture was prepared by the addition of a solution of 0.6g. NaOH and 0.6g. of NaAlO$_2$ in water to 33g. of an aqueous colloidal silica sol (30wt.-% SiO$_2$) containing additional water. The total water added was 62g. and the resultant molar oxide composition of the mixture was:

4.0 Na$_2$O : Al$_2$O$_3$ : 60 SiO$_2$ : 1580 H$_2$O

To this mixture was added, with stirring, 1.0g. of seed crystals of the zeolite of the present invention prepared in a previous experiment. The resultant mix was digested in a polytetrafluoroethylene-lined autoclave at 200° C. for 120 hours. The solid product was then filtered, washed with water and dried at 110° C. The product was found by x-ray powder diffraction to be predominantly the crystalline zeolite of the present invention in admixture with a minor amount of quartz.

EXAMPLE 11

A reaction mixture was prepared by the following procedure:

(a) 4.6g. of sodium aluminate (molar composition 1.15 Na$_2$O : Al$_2$O$_3$: 3.11 H$_2$O) and 6.2 grams NaOH were dissolved in 50 grams of water.

(b) 6.8g. of seed crystals of zeolite ZSM-5, which had been calcined at 600° C. to remove all organic material present therein as a result of the synthesis procedure, was slurried in 227.4g. H$_2$O.

(c) 74.1g. of amorphous solid reactive silica were slowly added to the slurry (b) and homogenized.

(d) The sodium aluminate solution of (a) was then combined with the homogenized composition of (c) and mixed thoroughly. The composition of this reaction mixture, exclusive of the calcined ZSM-5 seed, was 50 SiO$_2$ : Al$_2$O$_3$ : 5.0 Na$_2$O : 800 H$_2$O A portion of this mixture was placed in a polytetrafluoroethylene-lined autoclave and maintained under autogenous pressure at 125° C. for about 91.5 hours. The solid product of this reaction was filtered, washed with water and dried at 110° C. Its x-ray powder diffraction pattern identified it as the zeolite of the present invention in a highly pure form.

EXAMPLE 12

A reaction mixture was prepared by the following procedure:

(a) 3.9g. of $Al_2O_3 \cdot 3H_2O$ and 10.0g. of NaOH were heated in 20g. of $H_2O$ until dissolved;

(b) 8.5g. of the silica polymorph silicalite prepared in accordance with the procedure set forth in U.S. Pat. No. 4,061,724 and calcined at 600° C. for 2 hours to remove organic ammonium material incorporated during synthesis was slurried in 326.1 g of water;

(c) 89.2g. of amorphous solid reactive silica (containing 84.2 wt.-% $SiO_2$) was slowly blended into the silicalite seed slurry (b);

(d) the hot aluminate slurry of (a) was then added to the mixture of (c) and mixed thoroughly. The molar oxide composition of the resultant gel (exclusive of the silicalite seed) was $$5.0 \ Na_2O : Al_2O_3 : 50 \ SiO_2 : 800 \ H_2O$$

A portion of this mixture was then placed in a polytetrafluoroethylene-lined autoclave and maintained under autogenous pressure at about 125° C. for about 95 hours. The product after isolation by filtration, washing and drying was a well-crystallized sample of the crystalline product of this invention.

What is claimed is:

1. A synthetic crystalline zeolitic molecular sieve having a chemical composition expressed in terms of moles of oxides of $$0.8-3.0 \ M_2O : Al_2O_3 : 10-100 \ SiO_2 : 0-40 \ H_2O$$

wherein M represents a metallic cation and n represents the valance of M, and having an X-ray powder diffraction pattern having at least the d-spacings set forth in Table I, said zeolitic molecular sieve after being calcined in air at a temperature of 600° C. having an infrared spectrum exhibiting substantially no absorption within the rainge of 3600–3100 $cm^{-1}$.

2. Composition according to claim 1 wherein M represents sodium cations.

3. Composition according to claim 1 wherein M represents a mixture comprising sodium and lithium cations.

4. Composition according to claim 1 wherein M represents a mixture comprising sodium and barium cations.

5. Process for preparing the composition of claim 1 which comprises forming an aqueous reaction mixture consisting essentially of inorganic reagents and having the following composition in terms of mole ratios of oxides:

$SiO_2/Al_2O_3$—10 to 100
$Na_2O/SiO_2$—0.2 to 0.3
$H_2O/(Na_{2/n}O+M_2O)$—20 to 600
$(Na_2O+M_{2/n}O)/SiO_2$—0.02 to 0.5 wherein M represents a metal cation selected from Groups I and II of the Periodic System of Elements and n represents the valence of M, and maintaining said reaction mixture for a period of from 6 to 200 hours at a temperature of from 80° C. to 210° C. at autogenous pressure.

6. Process according to claim 5 wherein the reaction mixture has the following composition in terms of mole ratios of oxides:

$SiO_2/Al_2O_3$—20 to 80
$Na_2O/SiO_2$—0.02 to 0.20
$H_2O/(Na_2O+M_{2/n}O)$—30 to 500
$(Na_2O+M_{2/n}O)/SiO_2$—0.02 to 0.25

7. Process according to claim 6 wherein seed crystals of a crystalline silica polymorph having an X-ray powder diffraction pattern having at least the d-spacings set forth in Table I are incorporated into the aqueous reaction mixture.

8. Process according to claim 5 wherein the reaction mixture has the following composition in terms of mole ratios of oxides:

$SiO_2/Al_2O_3$—40 to 60
$Na_2O/SiO_2$—0.1
$H_2O/(Na_2O+M_{2/n}O)$—50 to 200
$(NaO+M_{2/n}O)/SiO_2$—0.1

9. Process according to claim 5 wherein sodium is the sole cation represented by M.

10. Process according to claim 9 wherein seed crystals of a crystalline silica polymorph having at least the d-spacings set forth in Table I are incorporated into the reaction mixture.

11. Process according to claim 5 wherein M represents lithium cations.

12. Process according to claim 5 wherein M represents barium cations.

13. Process according to claim 5 wherein seed crystals of a crystalline silica polymorph having at least the d-spacings set forth in Table I are incorporated into the aqueous reaction mixture.

14. Process for removing organic molecules from admixture with water molecules which comprises contacting said mixture with the zeolitic molecular sieve composition of claim 1, whereby the organic molecules are selectively adsorbed on said molecular sieve.

15. Process according to claim 14 wherein the water is in the liquid phase.

16. Process according to claim 14 wherein the water is in the vapor phase.

* * * * *

ADVERRSE DECISIONS IN INTERFERENCE

Notice of Adverse Decisions in Interference

In Interference No. 101,549, involving Patent No. 4,257,885, R. W. Grose, E. M. Flanigen, NOVEL ZEOLITE COMPOSITIONS AND PROCESSES FOR PREPARING AND USING THE SAME, final judgement adverse to the patentees was rendered March 23, 1990, as to claims 1-4, 7, 10 and 13.
*[Official Gazette October 23, 1990]*